(12) United States Patent
Barbalata et al.

(10) Patent No.: US 11,724,553 B2
(45) Date of Patent: Aug. 15, 2023

(54) VALVE SYSTEM, TIRE PARAMETER MONITORING SYSTEM AND METHOD FOR MOUNTING A TIRE PARAMETER MONITORING SYSTEM ONTO A WHEEL RIM OF A VEHICLE

(71) Applicant: CONTINENTAL AUTOMOTIVE GMBH, Hannover (DE)

(72) Inventors: Mihai Barbalata, Munich (DE); Adrian-Sinisa Racoviceanu, Munich (DE)

(73) Assignee: Continental Automotive GmbH, Hannover (DE)

( * ) Notice: Subject to any disclaimer, the term of this patent is extended or adjusted under 35 U.S.C. 154(b) by 148 days.

(21) Appl. No.: 17/170,996

(22) Filed: Feb. 9, 2021

(65) Prior Publication Data

US 2021/0252922 A1   Aug. 19, 2021

(30) Foreign Application Priority Data

Feb. 14, 2020   (EP) .................................... 20465506

(51) Int. Cl.
*B60C 23/04* (2006.01)

(52) U.S. Cl.
CPC ................ *B60C 23/0494* (2013.01)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0462; B60C 23/0411; B60C 23/20;

(Continued)

(56) References Cited

U.S. PATENT DOCUMENTS 6,722,409 B1 * 4/2004 Martin ................ B60C 23/0494
152/429
6,865,932 B2   3/2005 Luce
(Continued)

FOREIGN PATENT DOCUMENTS

CN        1762728 A    4/2006
CN     101638040 A    2/2010
(Continued)

OTHER PUBLICATIONS

Catalogue Alligator Ventilfabrik—Passenger car Snap-In valves, Alligatot Ventilfabrik GmbH, Giengen/Brenz, Germany.
(Continued)

*Primary Examiner* — Andre J Allen
(74) *Attorney, Agent, or Firm* — Laurence A. Greenberg; Werner H. Stemer; Ralph E. Locher

(57) ABSTRACT

A valve system for a tire parameter monitoring system includes a valve body having an elastomeric material and a connection element. The connection element includes a first engaging device with which the connection element is detachably connected to an electronic module of the tire parameter monitoring system, a second engaging device with which the connection element is detachably connected to the valve body, and a mounting section adapted to be detachably connected to a hole in a wheel rim. A tire parameter monitoring system and a method for mounting a tire parameter monitoring system to a wheel rim of a vehicle are also provided.

15 Claims, 3 Drawing Sheets

(58) Field of Classification Search
CPC . B60C 23/0444; B60C 11/24; B60C 23/0479; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/0025; G01M 7/04; G01M 7/06; G01M 9/02; G01M 9/04; G01M 99/002; G01M 99/004; G01M 3/002; G01M 3/04; G01M 7/02; G01M 9/06
USPC .................................................. 73/146–146.8
See application file for complete search history.

(56) References Cited

U.S. PATENT DOCUMENTS

| | | | |
|---|---|---|---|
| 7,870,866 B2 * | 1/2011 | Yu | B60C 23/0494 |
| | | | 73/146 |
| 8,047,068 B2 | 11/2011 | Hamm et al. | |
| 8,286,474 B2 | 10/2012 | Kempf et al. | |
| 9,895,944 B2 | 2/2018 | Gout et al. | |
| 10,549,586 B1 | 2/2020 | Mieyan | |
| 10,807,421 B2 * | 10/2020 | McClurg | B60C 23/0494 |
| 10,940,723 B2 | 3/2021 | Mieyan et al. | |
| 10,960,715 B2 * | 3/2021 | Peedikakkandy | B60C 29/02 |
| 11,065,924 B2 * | 7/2021 | Barjon | B60C 23/0486 |
| 11,338,629 B2 * | 5/2022 | McClurg | B60C 23/0494 |
| 2006/0075812 A1 | 4/2006 | Luce | |
| 2010/0024539 A1 * | 2/2010 | Hamm | B60C 23/0408 |
| | | | 73/146.8 |

(56) References Cited

U.S. PATENT DOCUMENTS

| | | | |
|---|---|---|---|
| 2012/0017672 A1* | 1/2012 | Uh | B60C 29/064 73/146.8 |
| 2015/0000763 A1 | 1/2015 | Recker et al. | |
| 2020/0001668 A1 | 6/2020 | Buttimer et al. | |
| 2020/0346502 A1* | 11/2020 | Mieyan | B60C 23/0494 |

FOREIGN PATENT DOCUMENTS

| | | | | |
|---|---|---|---|---|
| CN | 105691116 A | | 6/2016 | |
| CN | 109906155 A | | 6/2019 | |
| DE | 102019117276 A1 | | 1/2020 | |
| EP | 2818506 A1 | | 12/2014 | |
| EP | 3858645 A1 | * | 8/2021 | |
| FR | 2829063 A1 | | 3/2003 | |
| FR | 2907048 A1 | * | 4/2008 | B60C 23/0494 |
| FR | 2918315 A1 | | 1/2009 | |
| FR | 2978378 A1 | * | 2/2013 | B60C 23/0494 |
| GB | 2589142 A | * | 5/2021 | B60C 23/04 |
| WO | 2018078576 A1 | | 5/2018 | |
| WO | 2019155170 A1 | | 8/2019 | |
| WO | WO-2020114792 A1 | * | 6/2020 | B60C 23/0408 |

OTHER PUBLICATIONS

Catalogue Tyre Valves—Products Catalogue Buer 2001, Helmut Buer GmbH & Co. KG, Sprockhoevel, Germany.

* cited by examiner

VALVE SYSTEM, TIRE PARAMETER MONITORING SYSTEM AND METHOD FOR MOUNTING A TIRE PARAMETER MONITORING SYSTEM ONTO A WHEEL RIM OF A VEHICLE

CROSS-REFERENCE TO RELATED APPLICATION

This application claims the priority, under 35 U.S.C. § 119, of European Patent Application EP 20465506, filed Feb. 14, 2020; the prior application is herewith incorporated by reference in its entirety.

BACKGROUND OF THE INVENTION

Field of the Invention

The present invention relates to a system for measuring one or more parameters of a tire fitted to a wheel rim of a vehicle, such as the pressure of a tire fitted to the wheel rim of the vehicle. The invention also relates to a method for mounting a tire parameter monitoring system onto a wheel rim.

Tire parameter monitoring systems typically include an inflation valve for introducing or removing air from the tire and an electronic module which includes a sensor unit for measuring one of more parameters of the tire. The inflation valve is positioned in a bore or hole in the wheel rim and the electronic module is disposed inside the tire and is coupled with the inflation valve. Such a system may be used to inform the driver of any abnormal variation in the measured parameter, for example the tire pressure.

One type of tire parameter monitoring system or tire pressure monitoring system (TPMS) is known as the snap-in type, in which the inflation valve positioned on the outside of the wheel rim extends through a bore in the wheel rim and is connected to an electronic unit positioned on the inside of the wheel rim by a snap-in connection. Snap-in valves include an elastically deformable stem. An example of such a snap-in system is disclosed in European Patent Application EP 2 818 506 A1, corresponding to U.S. Patent Application Publication No. 2015/0000763.

It is desirable to provide a reliable seal between the elastically deformable stem of the inflation valve and the wheel rim while at the same time being able to simply assemble the tire parameter monitoring system to the wheel rim.

BRIEF SUMMARY OF THE INVENTION

It is accordingly an object of the invention to provide a valve system, a tire parameter monitoring system and a method for mounting a tire parameter monitoring system onto a wheel rim of a vehicle, which overcome the hereinafore-mentioned disadvantages of the heretofore-known systems and methods of this general type, which provide a reliable seal between the elastically deformable valve stem and the wheel rim and which can be easily mounted onto a wheel rim.

With the foregoing and other objects in view there is provided, in accordance with the invention, a valve system for a tire parameter monitoring system including multiple parts. The valve system includes a valve body including an elastomeric material and a connection element. The connection element includes a first engaging device with which the connection element is detachably attachable to an electronic module of the tire parameter monitoring system, a second engaging device with which the connection element is detachably attachable to the valve body and a mounting section that is adapted to be detachably attached to a hole or bore in the wheel rim.

The valve system according to the invention, therefore, includes two separate parts in place of the conventional single valve body of the snap-in type inflation valve. The connection element is placed in the tire parameter monitoring system between the electronic module, in which the sensing elements and circuitry are placed, and the valve body including the inflation valve that includes an elastomeric overmolding, for example rubber. The connection element also provides the connection between the valve system and the wheel rim since it has a mounting section that is adapted to be detachably attached to the hole in the wheel rim. The mounting section may, for example, be sized and shaped to be insertable into the hole in the wheel rim with a friction fit. The connection element and the mounting section may include a body formed of a metal or alloy, such as brass, with an elastomeric overmolding, for example rubber.

In some embodiments, the valve body includes a protruding engaging member for engaging with the second engaging device of the connection element. In some embodiments, the second engaging device of the connection element may be a thread, for example an internal thread formed in the inner wall of a cylindrical tube element of the connection element. In these embodiments, the protruding engaging member of the valve body may include an outer thread so that the protruding engaging member and, therefore, the valve body, can be screwed into the second engaging device of the connection element.

In some embodiments, the protruding engaging member of the valve body extends into a mating section. In some embodiments, the mating section flares radially outwardly from an axis of the protruding engaging member. For example, the protruding engaging member may extend into a conical-shaped mating section that flares radially outwardly in directions facing opposite to the end face of the protruding engaging member.

The connection element may further include a receiving device for accepting the mating section of the valve body. For example, the receiving device may include a receptacle having a conical inner surface that flares outwardly from its longitudinal axis in the direction of the end face of the mounting section. The conical mating section of the valve body, which flares outwardly in the direction of the cap of the valve body, can be inserted into the conical receiving device.

In some embodiments, the receiving device includes two or more parts that are movable radially outward upon insertion of the mating section of the valve body into the receiving device of the connection element. This embodiment can be used to provide an additional seal between an outer surface of the mounting section of the connection element and the hole in the wheel rim. In some embodiments, the connection element includes a core formed of metal or alloy or some other material with little plasticity, that is overmolded with an elastomeric material. Mechanical engagement of the mating section of the valve body with the movable metal parts of the receiving device causes the metal parts to be forced radially outwardly in such a way that the overmolding of the plastic elastomeric material of the mounting section of the connection element is pushed against the hole in the wheel rim thus improving the seal between the connection element and the wheel rim.

The connection element is also detachably attachable to the electronic module by the first engaging device. The first engaging device may include an internal thread which is engageable with the electronic module by a screw in order to detachably attach the connection element to the electronic module. The first engaging device may be positioned at the first end of the connection element and the mounting section positioned at the second end of the connection element, for example on opposing sides of a middle section.

In some embodiments, the first engaging device is positioned within a cylindrical middle part of a connection element that has a greater diameter than the mounting section. The inner surface of the cylindrical middle part may provide a bushing or sealing face which is positioned on the inner surface of the wheel rim in the assembled condition. In embodiments in which the cylindrical part is overmolded with an elastomeric material, such as rubber, the bushing provides a further sealing ring between the connection element and the inner surface of the wheel rim in addition to the seal provided between the outer surface of the mounting section and the bore in the wheel rim.

In some embodiments, the elastomeric material of the valve body includes a sealing ring that is securable against the outer surface of the wheel rim. For example, the elastomeric material of the valve body can be formed to flare radially outwardly and have a flat end surface which is securable against the outer surface of the wheel rim to provide a sealing face or ring.

In some embodiments, the external surface of the valve body includes one or more gripping elements. The gripping elements may include a protrusion, for example. The gripping elements may be used to allow better gripping of the valve body when securing the valve body to the connection element. In some embodiments, the gripping elements are sized, shaped and disposed in such a way that they have an outer radial surface which is grippable by a tool such as a nut or spanner. This may be useful in securing the valve body to the connection element and the wheel rim using a predefined torque. For example, the outer radial surface may be engageable with a standard hexagonal bolt. In some embodiments, two, three or four protrusions may be provided.

With the objects of the invention in view, there is also provided a tire monitoring system which includes the valve system having the valve body and connection element according to any one of the embodiments described herein, and an electronic module.

The electronic module may include one or more sensor units or sense circuits for monitoring a parameter of the tire, that are positioned within a housing of the electronic module. In one particular embodiment, the electronic module accommodates a tire pressure sensor unit.

With the objects of the invention in view, there is furthermore provided a method for mounting a tire parameter monitoring system to a wheel rim. A first engaging device of a connection element is detachably attached to an electronic module. The connection element further includes a mounting section adapted to be detachably attached to a hole in a wheel rim of a vehicle and a second engaging device with which the connection element is detachably attachable to the valve body. The mounting section of the connection element is inserted from an inner surface of the wheel rim into a hole in the wheel rim. A valve body including elastomeric material is positioned on an outer surface of the wheel rim and is detachably attached to the connection element. The connection element is, therefore, first attached to the electronic module to form a subassembly and the subassembly, i.e. the electronic module with the connection element attached to it, is attached to the inside of the wheel rim by inserting the mounting section of the connection element into the hole in the wheel rim. Afterwards, the valve body is positioned on the opposing outer surface of the wheel rim and is attached to the connection element.

In some embodiments, the mounting section of the connection element further includes a receiving device for mating with the valve body. The second engaging device may be positioned between the first engaging device and the receiving device.

In some embodiments, the receiving device includes two or more parts that are movable radially outward. The valve body includes a protruding engaging member for engaging with the second engaging device of the connecting element. The protruding engaging member extends into a mating section that flares radially outward from an axis of the protruding engaging member. In these embodiments, the method further includes inserting the mating section of the valve body into the receiving device of the connection element and engaging the protruding engaging member of the valve body with the second engaging device of the connection element. The parts of the receiving device are urged radially outward by the mechanical engagement of the mating section of the valve body with the inner surface of the parts. This radially outward movement consequently causes movement of the outer surface of the mounting section, which is formed of elastomeric material, radially outward into the side wall of the bore. This improves the seal between the outer surface of the mounting section of the connection element and the hole in the wheel rim.

In some embodiments, the method further includes sealing the elastomeric material of the valve body against the outer surface of the wheel rim and the elastomeric material of a bush section of the connection element against the inner surface of the wheel rim by engaging the protruding engaging member of the valve body with the second engaging device of the connection element. For example, an external thread on the protruding engaging member of the valve body can be inserted with a screwing action into an internal thread of the second engaging device of the connection element thus tightening the sealing brush of the connection element and the valve body against opposing surfaces of the wheel rim. At the same time, the mating section of the valve body is inserted into the receiving device of the connection element causing the two or more parts of the receiving device to move radially outward and provide a further seal between an outer surface of the mounting section of the connection element and the surface defining the bore in the wheel rim and also around the edges of the bore with the inner and outer surfaces of the wheel rim.

Other features which are considered as characteristic for the invention are set forth in the appended claims.

Although the invention is illustrated and described herein as embodied in a valve system, a tire parameter monitoring system and a method for mounting a tire parameter monitoring system onto a wheel rim of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
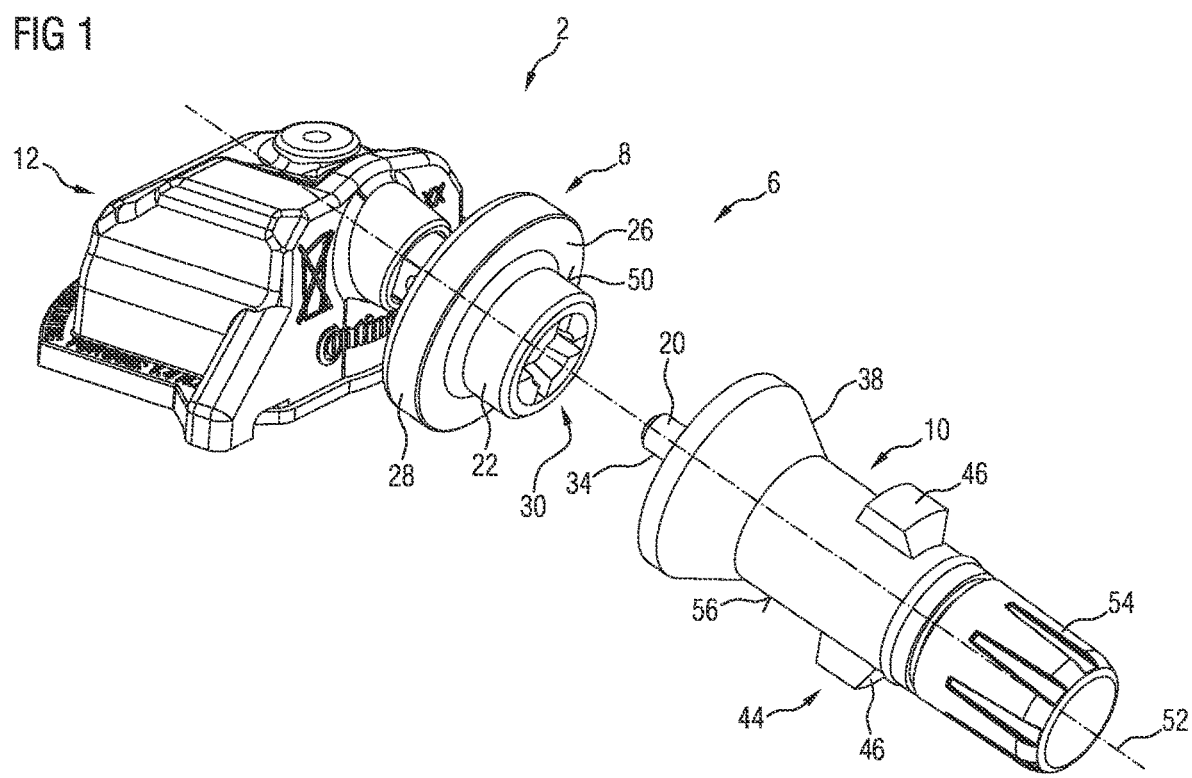
FIG. 1 is a diagrammatic, perspective view of a tire parameter monitoring system in a partially assembled condition.
Figure 2:
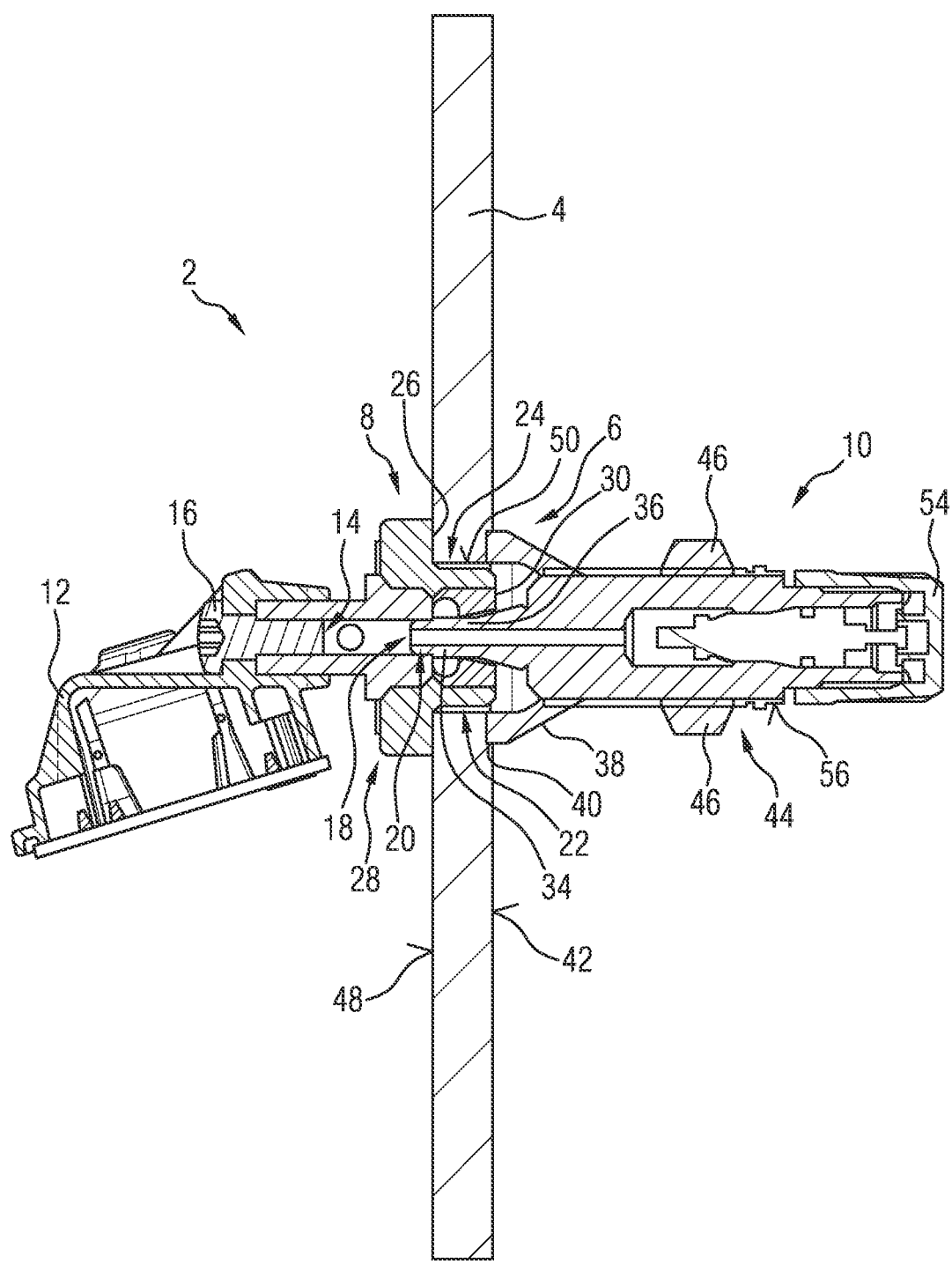
FIG. 2 is a longitudinal-sectional view of the tire parameter monitor system of FIG. 1 assembled on a wheel rim of a vehicle.

Referring now to the figures of the drawings in detail and first, particularly, to FIG. 1 thereof, there is seen a perspective view of a tire parameter monitoring system (TPMS) 2 in a partially assembled condition, whereas FIG. 2 illustrates a longitudinal-sectional view of the tire parameter monitor system 2 of FIG. 1 assembled on a wheel rim 4 of a vehicle.

The tire parameter monitoring system 2 includes a valve system 6, which includes a connection element 8 and a valve body 10, and an electronic module 12 that houses one or more sensors and associated circuitry. The tire parameter monitoring system 2 may monitor the tire pressure, for example, and optionally further parameters of the tire such as tire temperature. The electronic module 12 typically includes a transmitter for transmitting a signal representative of the measured parameter to an external unit, for example a control unit of the vehicle.

The tire parameter monitoring system 2 is of the snap-in type so that the valve body 10 and the connection element 8 include elastomeric material, for example rubber, that is provided as an overmolding on a non-deformable body that may be formed or a metal or alloy, for example a brass body. In place of the conventional snap-in type valve stem that includes a single part that is inserted into the hole in a wheel rim 4 by a snap-in action, the valve system 6 includes two separate parts, the connection element 8 and the valve body 10.

The connection element 8 of the valve system 2 is coupled between the electronic module 12 and the valve body 10 and in the assembled condition is positioned on the inside of the wheel rim 4 along with the electronic module 12. The valve body 10 is positioned on the outside of the wheel rim 4.

The connection element 8 includes a first engaging device 14 in the form of an internal thread with which the connection element 8 is detachably attachable to the electronic module 12, for example by a screw 16. The connection element 8 also includes a second engaging device 18 with which the connection element 8 is detachably attachable to the valve body 10. The second engaging device 18 may be an internal thread into which an external thread 20 or screw connection of the valve body 10 can be detachably attached to the connection element 8.

The connection element 8 includes a mounting section 22 which is adapted to be detachably connected to a hole 24 in the wheel rim 4 of the vehicle. The mounting section 22 has the form of a cylindrical section including a body that is overmolded with the elastomeric material. The mounting section 22 may be sized and shaped to be inserted into the hole 24 with a friction fit. For example, the outer diameter and length of the mounting section 22 may be sized so as to allow a friction fit between the outer surface of the overmolding and the hole 24 in the wheel rim 4.

The mounting section 22 extends from a middle section 28 of the connecting element 8 that has a larger diameter than the mounting section 22. The middle section 28 has a face 26 extending radially outwards from the mounting section 22 that provides a sealing face, which in the assembled state, is urged against the inner surface 48 of the wheel rim 4 to provide a seal. The second engaging device 18 is positioned in the body of the middle section 28. The first engaging device 14 for attaching the connection element 8 to the electronic module 12 may protrude from the opposing surface of the middle section 28 to the mounting section 22.

Figure 3A:
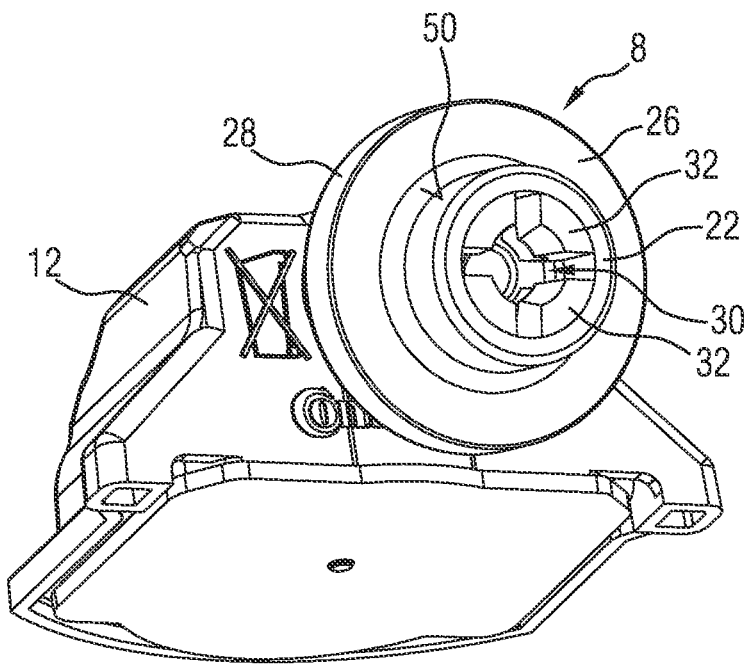
FIG. 3A is a perspective view of a connection element and an electronic module of the tire parameter monitoring system of FIGS. 1 and 2.

Referring to the perspective view of FIG. 3A, the mounting section 22 includes an accepting or receiving section 30 in its center into which the valve body 10 is inserted. The receiving section 30 has two or more separate parts 32 that are able to move radially outwards from the axis 52 of the receiving section 30. The receiving section 30 is formed by the material of the nondeformable body of the connection element 8.

The valve body 10 also includes a nondeformable body that is overmolded with an elastomeric material such as rubber. The valve body 10 includes a cap 54 at the distal end that covers the pin of the valve and at the opposing proximal end includes a protruding engaging member 34 that includes the external thread 20 for attaching the valve body 10 to the second engaging device 18 of the connection element 8. The protruding engaging member 34 is cylindrical. The protruding engaging member 34 extends into a mating section 36 that flares radially outward from the longitudinal axis 52 of the valve body 10 and of the protruding engaging member 34 in directions towards the distal end of the valve body 10. The mating section 36 may be conical.

Figure 3B:
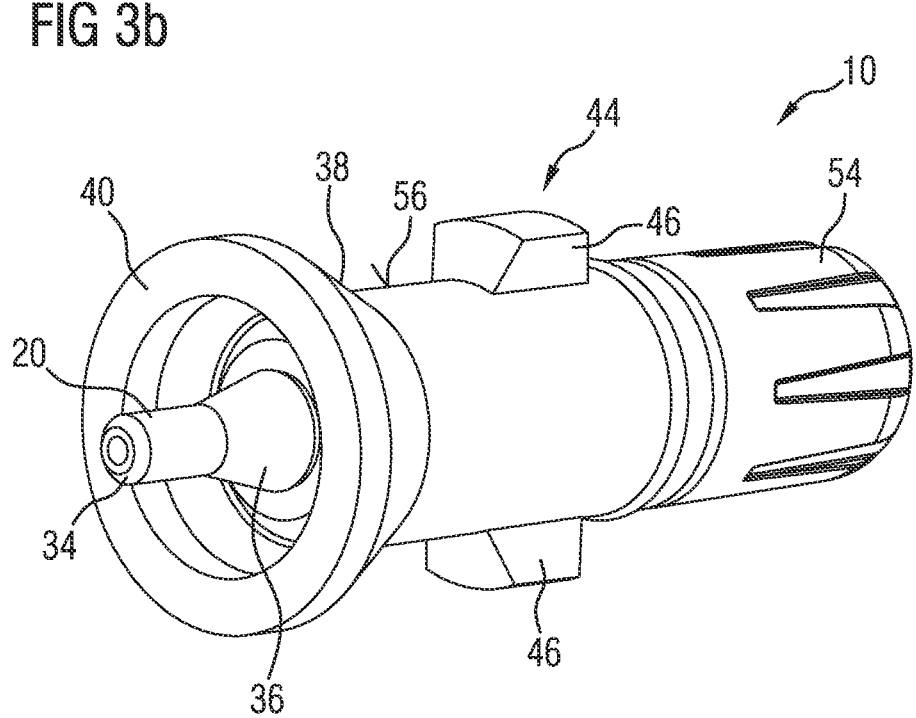
FIG. 3B is a perspective view of a valve body of the tire parameter monitoring system of FIGS. 1 and 2.

Referring to the perspective view of the valve body 10 of FIG. 3B, the protruding engaging member 34 and mating section 36 of the valve body 36 are surrounded by a flared section 38 that is conical and has an inner surface that is spaced apart from the protruding engaging member 34 and the mating section 36. The flared section 38 has a flat end face 40 that forms a sealing rim that is positioned against the outer surface 42 of the wheel rim 4 in the assembled condition.

The valve body 10 also includes a gripping device 44 in the form of one or more protrusions or wings 46 that protrude from the outer surface 56 of the valve body 10. Referring to FIGS. 1, 2 and 3B, in the illustrated embodiment two wings 46 are provided that extend outwardly from opposing sides of the valve body 10. Each wing 46 is sized and shaped so that together the wings 46 have outer surfaces that correspond to the size and shape of a nut. This allows the gripping device 44 to be gripped by a socket wrench for tightening the valve body 10 against the outer surface 42 of the wheel rim 4. Additionally, a torque wrench can be used to tighten the valve body 10 against the outer surface 42 with a predetermined torque to improve the sealing action.

In order to assemble the tire parameter monitoring system 2, the connection element 8 is detachably attached to the electronic module 12 by inserting the screw 16 through a fitting in the electronic module 12 into the first engaging device 14 in the form of the internal thread of the connection element 8.

The mounting section 22 of the connection element 8 is inserted from an inner surface 48 of the wheel rim 4 into a hole 24 in the wheel rim 4 while the connection element 8 is attached to the electronic module 12. The valve body 10 is positioned on the outer surface 42 of the wheel rim 4 and inserted into the receiving device 30 of the connection element 8 that is positioned in the hole 24. The protruding engaging member 34 is screwed into the second engaging device 18 of the connection element 8. This pulls the face 26 of the connection element 8 against the inner surface 48, while the mating section 36 of the valve body 10 is urged into the receiving device 30, urging the parts 32 of the receiving device radially outward, which in turn urges the outer surface 50 of the overmolding of the mounting section 22 of the connection element 8 into the wall of the hole 24 to improve the sealing action between the elastomeric material of the overmolding of the mounting section 22 and the hole 24. The sealing end face or rim 40 of the valve body 10 is tightened against the outer surface 42 of the wheel rim 4 to improve the seal between the valve body 10 and the outer surface 42.

The invention claimed is:

1. A valve system for a tire parameter monitoring system, the valve system comprising:
   a valve body including an elastomeric material; and
   a connection element including:
      a first engaging device for detachably connecting said connection element to an electronic module of the tire parameter monitoring system,
      a second engaging device for detachably connecting said connection element to said valve body, and
      a mounting section adapted to be detachably attached to a hole in a wheel rim; and
   said valve body configured for detachably connecting to said mounting section at the wheel rim, said valve body including a first sealing face configured to contact said wheel rim on one side of said hole and said mounting section including a second sealing face configured to contact said wheel rim on the other side of said hole from said first sealing face when said valve body is detachably connected to said mounting section at the wheel rim.

2. The valve system according to claim 1, wherein said connection element includes a core formed of a metal or alloy being overmolded with an elastomeric material.

3. The valve system according to claim 1, wherein said first engaging device of said connection element includes an internal thread engageable with a screw to detachably connect said connection element to the electronic module.

4. The valve system according to claim 1, wherein said elastomeric material of said valve body includes a sealing rim to be secured against an outer surface of the wheel rim.

5. The valve system according to claim 1, wherein said valve body has an external surface including one or more gripping elements.

6. The valve system according to claim 5, wherein said one or more gripping elements include respective protrusions.

7. A tire parameter monitoring system, comprising:
   an electronic module; and
   a valve system according to claim 1;
   said connection element configured to detachably secure said electronic module and said valve body on opposite sides of the wheel rim from one another.

8. The tire parameter monitoring system according to claim 7, wherein said electronic module accommodates a tire pressure sensor unit.

9. A valve system for a tire parameter monitoring system, the valve system comprising:
   a valve body including an elastomeric material; and
   a connection element including:
      a first engaging device for detachably connecting said connection element to an electronic module of the tire parameter monitoring system,
      a second engaging device for detachably connecting said connection element to said valve body, and
      a mounting section adapted to be detachably attached to a hole in a wheel rim;
   wherein said valve body includes a protruding engaging member for engaging with said second engaging device of said connection element, said protruding engaging member extending into a mating section flaring radially outward from an axis of said protruding engaging member.

10. The valve system according to claim 9, wherein said second engaging device of said connection element is an internal thread and said protruding engaging member of said valve body includes an external thread, said external thread of said valve body being engageable with said internal thread of said connection element to detachably attach said connection element to said valve body.

11. The valve system according to claim 9, wherein said connection element includes a receiving device for receiving said mating section of said valve body.

12. The valve system according to claim 11, wherein said receiving device includes two or more parts being movable radially outward upon insertion of said mating section of said valve body into said receiving device of said connection element to provide a seal between an outer surface of said mounting section of said connection element and the hole in the wheel rim.

13. A method for mounting a tire parameter monitoring system to a wheel rim of a vehicle, the method comprising:
   providing a connection element including a first engaging device, a second engaging device and a mounting section adapted to be detachably connected to a hole in the wheel rim;
   detachably connecting the first engaging device to an electronic module;
   detachably connecting the second engaging device to a valve body having an elastomeric material;
   inserting the mounting section of the connection element from an inner surface of the wheel rim into the hole in the wheel rim; and
   detachably connecting the valve body to the connection element while positioning the elastomeric material of the valve body on an outer surface of the wheel rim.

14. The method according to claim 13, which further comprises:
   providing the mounting section of the connection element with a receiving device including two or more parts being movable radially outward;
   providing the valve body with a protruding engaging member for engaging with the second engaging device of the connection element, the protruding engaging member extending into a mating section flaring radially outward from an axis of the protruding engaging member;
   inserting the mating section of the valve body into the receiving device of the connection element; and
   engaging the protruding engaging member of the valve body with the second engaging device of the connection element to provide a seal between an outer surface of the mounting section of the connection element and the hole in the wheel rim.

15. The method according to claim 14, which further comprises sealing the elastomeric material of the valve body against the outer surface of the wheel rim and sealing an elastomeric material of the mounting section against the inner surface of the wheel rim by engaging the protruding engaging member of the valve body with the second engaging device of the connection element.

* * * * *